United States Patent
Bilavarn et al.

(10) Patent No.: US 9,582,325 B2
(45) Date of Patent: Feb. 28, 2017

(54) METHOD FOR SCHEDULING WITH DEADLINE CONSTRAINTS, IN PARTICULAR IN LINUX, CARRIED OUT IN USER SPACE

(71) Applicant: Centre National de la Recherche Scientifique, Paris (FR)

(72) Inventors: Sébastien Bilavarn, Golfe Juan (FR); Muhammad Khurram Bhatti, Karachi (PK); Cécile Belleudy, Villars sur Var (FR)

(73) Assignee: Centre National De La Recherche Scientfique, Paris (FR)

( * ) Notice: Subject to any disclaimer, the term of this patent is extended or adjusted under 35 U.S.C. 154(b) by 0 days.

(21) Appl. No.: 14/441,070

(22) PCT Filed: Nov. 5, 2013

(86) PCT No.: PCT/IB2013/059916
§ 371 (c)(1),
(2) Date: May 6, 2015

(87) PCT Pub. No.: WO2014/072904
PCT Pub. Date: May 15, 2014

(65) Prior Publication Data
US 2015/0293787 A1    Oct. 15, 2015

(30) Foreign Application Priority Data
Nov. 6, 2012  (FR) ........................ 12 60529

(51) Int. Cl.
G06F 9/46  (2006.01)
G06F 9/48  (2006.01)
G06F 1/26  (2006.01)

(52) U.S. Cl.
CPC ............. *G06F 9/4887* (2013.01); *G06F 1/26* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 2004/0098722 | A1* | 5/2004 | Funaki | G06F 9/4881 718/103 |
| 2006/0206887 | A1* | 9/2006 | Dodge | G06F 9/4881 717/161 |
| 2007/0074217 | A1 | 3/2007 | Rakvic et al. | |
| 2009/0328058 | A1* | 12/2009 | Papaefstathiou | G06F 9/485 718/107 |
| 2010/0037242 | A1* | 2/2010 | Mannarswamy | G06F 9/526 719/328 |

(Continued)

FOREIGN PATENT DOCUMENTS

WO    WO 2009/158220 A2    12/2009

OTHER PUBLICATIONS

Jonathan Corbet(Deadline scheduling for Linux, Oct. 13, 2009).*

(Continued)

*Primary Examiner* — Sisley Kim
(74) *Attorney, Agent, or Firm* — Alston & Bird LLP

(57) ABSTRACT

A method for scheduling tasks with deadline constraints, based on a model of independent periodic tasks and carried out in the user space by means of API POSIX is provided.

17 Claims, 2 Drawing Sheets

(56) References Cited

U.S. PATENT DOCUMENTS

| | | | | |
|---|---|---|---|---|
| 2010/0218194 | A1* | 8/2010 | Dallman | G06F 9/5033 |
| | | | | 718/104 |
| 2012/0180056 | A1 | 7/2012 | Sander et al. | |
| 2013/0166271 | A1* | 6/2013 | Danielsson | G06F 11/3664 |
| | | | | 703/22 |
| 2013/0290749 | A1* | 10/2013 | Broekaert | G06F 1/3203 |
| | | | | 713/300 |

OTHER PUBLICATIONS

International Search Report and Written Opinion for International Application No. PCT/IB2013/059916, dated Dec. 12, 2013.

Chéour, R. et al., *EDF scheduler technique for wireless sensors networks: case study*, Fourth International Conference on Sensing Technology, (Jun. 2010).

Chéour, R. et al., *Exploitation of the EDF scheduling in the wireless sensors networks*, Measurement Science Technology Journal (IOP), Special Issue on Sensing Technology: Devices, Signals and Materials (2011).

Love, Robert, *LINUX system programming*, O'Reilly, (2007).

\* cited by examiner

METHOD FOR SCHEDULING WITH DEADLINE CONSTRAINTS, IN PARTICULAR IN LINUX, CARRIED OUT IN USER SPACE

FIELD

The invention concerns a method allowing the performance of monoprocessor, multiprocessor or multikernel scheduling of tasks with deadline constraints. A scheduler of tasks with deadline constraints means that each task has a termination time that it must not exceed. The scheduling performed supports execution on a single processor or a plurality of processors. It is performed under Linux, or any other operating system that supports the POSIX standard, and more particularly its extension POSIX.1c, but is not integrated in the kernel: this is because it works in user space.

BACKGROUND

User space is a mode of operation for user applications, as opposed to kernel space, which is a supervisor mode of operation that has advanced functionalities having all rights, particularly the one for accessing all the resources of a microprocessor. Manipulation of resources is nevertheless made possible in user space by what are known as API ("Application Programming Interface") functionalities, which themselves rely on the use of peripheral pilots. The development of a solution in user space makes possible and facilitates development of schedulers with time constraints in relation to direct integration into the kernel of the operating system, which is made very difficult by its complexity. Another advantage is that it brings increased stability because an execution error in user space does not have serious consequences for the integrity of the rest of the system.

In order to perform scheduling in user space, the method of the invention relies particularly on the mechanisms defined by the POSIX ("Portable Operating System Interface-X", the "X" expressing the Unix heritage) standard and its extension POSIX.1c, and notably on the POSIX task structure, the POSIX threads ("pthreads") and the POSIX task management APIs. It should be remembered that a process is a program instance that is being executed, a "task" is a division of a process and a "thread" is the accomplishment of a task under Linux by means of the POSIX APIs; a thread or task cannot exist without a process, but there may be a plurality of threads or tasks per process. In this regard, reference may be made to the work by Robert Love "*LINUX system programming*", O'Reilly, 2007.

Linux is a system in which the management of time is called "shared time", as opposed to "realtime" management. In this type of management, several factors linked to the operation of the system, such as resource sharing, input/output management, interrupts, influence on virtual memory etc., give rise to temporal uncertainties about the execution times of the tasks. Therefore, it is not possible to guarantee a "hard" realtime solution, that is to say one in which the execution of each task is accomplished within strict and inviolable time limits. The realization of the proposed scheduler is nevertheless suitable for what are known as "soft" realtime systems, or systems "with deadline constraints", which accept variations in the processing of the data of the order of no more than one second. This is the case with a large number of realtime applications, for example multimedia applications.

As it is not natively a realtime system, several technical solutions are, however, possible for making the Linux kernel compatible with realtime constraints. The most common solution involves associating therewith an auxiliary realtime kernel having a genuine realtime scheduler (RT Linux, RTAI, XENOMAI). This auxiliary realtime kernel has priority and processes realtime tasks directly. Other (non-realtime) tasks are delegated to the standard Linux kernel, which is considered to be a background task (or job) with lower priority. However, the development of a specific scheduler integrated into the kernel is very difficult because it requires in-depth knowledge of the kernel and involves heavy kernel development, with all the complexity and instability that that brings. Moreover, realtime Linux extensions are supported by a smaller number of platforms. The proposed solution allows implementation in user space that is therefore simpler, more stable and can be applied to any platform supporting a standard Linux kernel. This approach does not allow hard realtime constraints to be guaranteed, but considerably simplifies the development of a scheduler while being suitable for soft realtime applications (the great majority of applications).

SUMMARY

A method for scheduling according to the invention is particularly suitable for the implementation of low-consumption oriented scheduling policies, for example an EDF ("earliest deadline first") policy—which is a particular type of scheduling with deadline constraints—with dynamic voltage and frequency scaling (DVFS) in order to minimize consumption, which is important in onboard applications. In this regard, see the following articles:

R. Chéour et al. "*EDF scheduler technique for wireless sensors networks: case study*" Fourth International Conference on Sensing Technology, 3-5 Jun. 2010, Lecce, Italy;

R. Chéour et al. "*Exploitation of the EDF scheduling in the wireless sensors networks*", Measurement Science Technology Journal (IOP), Special Issue on Sensing Technology: Devices, Signals and Materials, 2011.

There are numerous works on low-consumption scheduling, but these essentially remain theoretical and are practically never integrated into an operating system owing to the complexity of this work. The proposed solution, since implemented entirely in user space, greatly facilitates this integration.

An object of the invention is therefore a method for scheduling tasks with deadline constraints, which is based on a model of independent periodic tasks and performed in user space, in which:

each task to be scheduled is associated with a data structure, which is defined in user space and contains at least one time information item (deadline and/or period) and an information item that is indicative of a state of activity of the task, said state of activity being chosen from a list comprising at least:
  a state of a task being executed;
  a state of a task awaiting the end of its execution period; and
  a state of a task ready to be executed, awaiting a resumption condition;
in the course of its execution, each task modifies said information item that is indicative of its state of activity and, if need be, according to a predefined scheduling policy, calls a scheduler that is executed in user space;

upon each call, said scheduler:
sets up a queue for the tasks that are ready to be executed, awaiting a resumption condition;
sorts said queue according to a predefined priority criterion;
if necessary, preempts a task being executed by sending it a signal forcing it to change to said state of a task ready to be executed, awaiting a resumption condition; and
sends said resumption condition at least to the task that is at the head of said queue.

According to various embodiments of the method of the invention:
said scheduling policy may be a preemptive policy, for example chosen from among a policy of EDF type and derivatives thereof such as DSF ("Deterministic Stretch to Fit") and AsDPM ("Assertive Dynamic Power Management"), RM ("Rate Monotonic"), DM ("Deadline Monotonic") and LLF ("Least Laxity First").
The method can be implemented in a multiprocessor platform, said data structure likewise comprising an information item relating to a processor to which the corresponding task is assigned, and in which said scheduler assigns to a processor of the system each task that is ready to be executed.
Said scheduler can modify the clock frequency and the power supply voltage of the or of at least one processor according to a DVFS policy.
The method can have an initialization step, in the course of which:
the tasks to be scheduled are created, assigned to one and the same processor and put into a state awaiting a resumption condition, a global variable called a rendez-vous variable being incremented or decremented when each said task is created;
when said rendez-vous variable takes a predefined value indicating that all the tasks have been created, said scheduler is executed for the first time.
Said data structure may likewise contain information that is indicative of a pthread associated with said task and with its worst-case execution time.
The method can be executed under an operating system that is compatible with a POSIX.1c standard, which may particularly be a Linux system. In this case:
upon each call for the scheduler, a "pthread" is created in order to ensure execution thereof.
The method can involve the use of a MUTEX in order to ensure the execution of a single instance of the scheduler at a time.
The assignment of a task to a processor can be performed by means of the CPU Affinity API.

Another object of the invention is a computer program product for implementing a method for scheduling as claimed in one of the preceding claims.

BRIEF DESCRIPTION OF THE DRAWINGS

Other features, details and advantages of the invention will emerge upon reading the description that is provided with reference to the appended drawings, which are given by way of example and in which, respectively.

DETAILED DESCRIPTION

Figure 1:
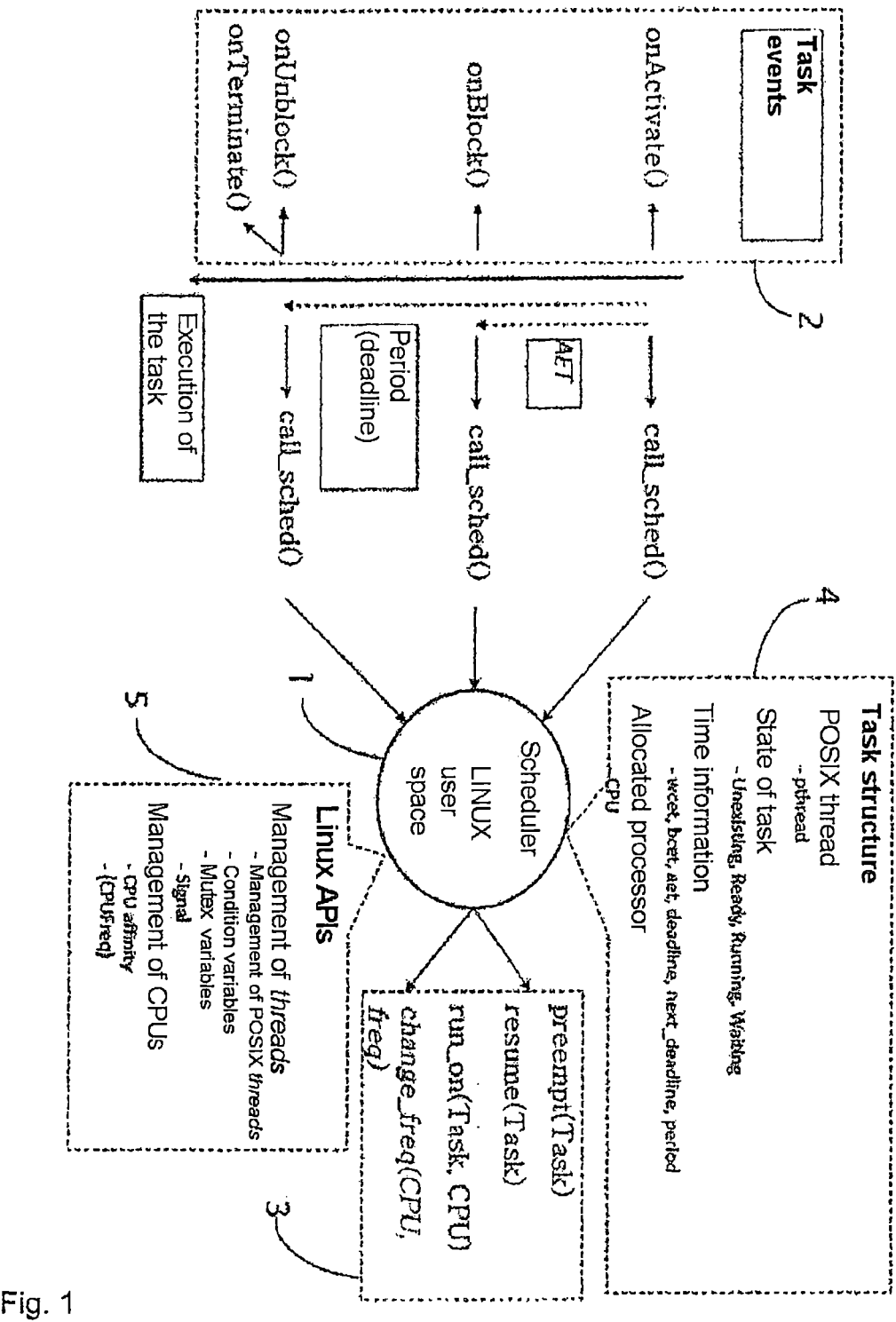
FIG. 1 shows the principle of implementation for a method for scheduling according to the invention in Linux user space.

The principle of implementation for a scheduler in user space according to an embodiment of the invention, which is based on a Linux operating system, is illustrated in FIG. 1. An application is seen as a set of tasks to be scheduled 2. The scheduler 1 controls the execution of these tasks by means of three specific functions (reference 3): "preempt (Task)", "resume(Task)" and "run_on(Task, CPU)". These functions—the names of which are arbitrary and given solely by way of nonlimiting example—allow the preemption of a task, the resumption of a task and the allocation of a task to a processor, respectively. They rely on the use of functionalities provided by the Linux APIs (reference 5) allowing control of the tasks and of the processors from user space.

To operate, the scheduler needs to have specific information that comes from the model of tasks that is used. For a model of periodic and independent tasks, this is at least information relating to the deadline of each task, the period thereof and the state of activity thereof; other time information can likewise be provided: worst case execution time (WCET), subsequent deadline (that is to say: current time plus deadline—to avoid confusion with the "subsequent deadline", the "deadline" is sometimes called "absolute deadline"), etc. In the case of a multiprocessor platform, the scheduler likewise requires an information item that is indicative of the processor to which the task is assigned. Moreover, each task is associated with a POSIX thread ("pthread"), which likewise needs to be known to the scheduler.

Other information likely to be necessary to the scheduler is: a MUTEX associated with the task, a condition associated with the task, a Linux identifier for the task.

The best case execution time (BCET) and the actual execution time (AET) is information that, without being indispensible for performing scheduling, is very useful for development because it allows (particularly the AET) the execution time of a task to be fixed (the execution time of a task normally varies from one execution to the other). This facilitates verification of the scheduling by allowing it to be compared with simulation results (with tasks having the same parameters and overall exactly the same execution times).

In the standard Linux POSIX task structure (pthread), this information is not accessible in user space. For this reason, the implementation of the invention requires extension of this task structure, through the creation of a type personalized using a data structure.

The application model is made up of periodic and independent tasks. A model of periodic tasks refers to the specification of homogeneous sets of jobs that are repeated at periodic intervals; a "job" is a particular form of task, and more precisely an independent task whose execution is strictly independent of the results of the other "jobs". A model of independent tasks refers to a set of tasks for which the execution of one task is not subordinate to the situation of another. This model supports synchronous and asynchronous task execution, and can be used in a large number of real applications that need to comply with time constraints. Knowledge of the characteristics and time constraints of the tasks (deadline, period, worst execution time, etc.) is therefore necessary in order to use this type of scheduling. As explained above, this information is added to a specific structure that extends the standard task type under Linux.

Figure 2:
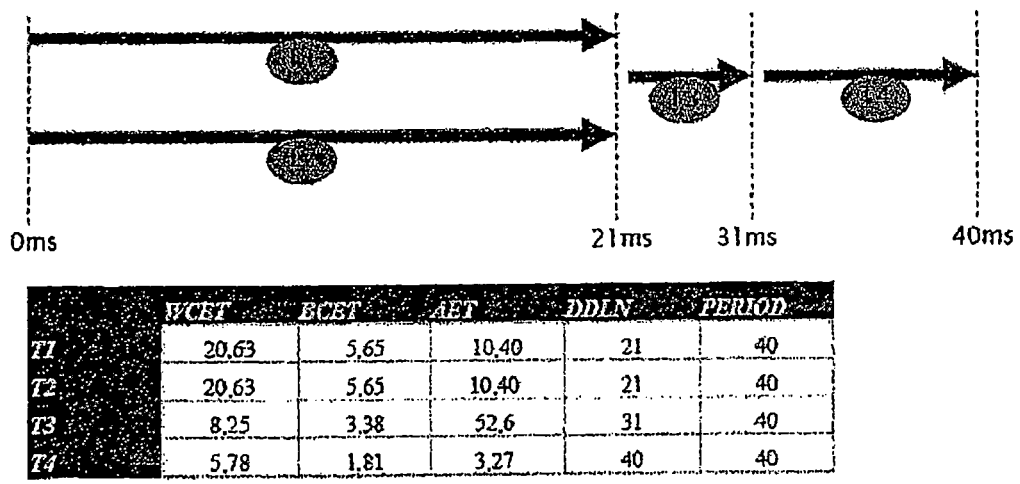
FIG. 2 shows an example of a set of independent periodic tasks.

FIG. 2 illustrates an application model of periodic and independent tasks comprising four tasks T1-T4. Tasks T1 and T2 need to be executed before their deadline (DDLN) of 21 ms (milliseconds), T3 before its deadline of 31 ms and T4 before its deadline of 40 ms. Each task is executed in an actual time AET ("Actual Execution Time") f, which is between a minimum value BCET ("Best Case Execution Time") and a maximum value WCET ("Worst Case Execution Time"). At the end of its execution, a task starts to wait until it reaches its period in which it becomes ready for reexecution again. Thus, at each instant, a task takes one state from the following:

a state of a task being executed;
a state of a task awaiting the end of its execution period; and
a state of a task ready to be executed, awaiting a resumption condition;

to which it is possible to add a state of an unexisting task, before activation thereof.

The example of FIG. 2 refers particularly to a video application in which each of the four tasks corresponds to particular processing of a frame. These four tasks are therefore repeated every 40 ms (period) in order to be able to process 25 frames per second.

One or more queues are used to store the tasks. At least one queue is necessary in order to produce scheduling with deadline constraints, in order to store the list of tasks that are ready. A priority is likewise associated with each task in order to define the order of execution thereof. The priority criterion is dependent on the scheduling policy. For the EDF ("Earliest Deadline First") policy, for example, the priority criterion is the proximity of the deadline: the task having the closest deadline has the highest priority. The queue of tasks that are ready is generally sorted in order of decreasing priority. The priority criterion under consideration here is different than the priority criteria that are used in native Linux schedulers (shared time). The scheduler is called at precise instants, called scheduling instants, which are triggered by the tasks themselves at moments that are characteristic of their execution. These moments are called task events (reference 2 in FIG. 1), corresponding, by way of example, to their activation ("onActivate"), their end of execution ("onBlock"), their reactivation ("onUnBlock") or their termination ("onTerminate")—these names are arbitrary and given solely by way of nonlimiting example.

The events are triggered, at the appropriate moments of the execution of an application task, by calls to "onActivate( )", "onBlock( )", "onUnBlock( )", "onTerminate( )" functions, which are inserted into its code. Each task event updates the fields of the task structure for the task in question (state, subsequent deadline, period, etc.) and calls the scheduler if necessary. Whether or not the scheduler is called by a task event depends on the scheduling policy. For an EDF policy, for example, the scheduler is called on "onActivate" "onBlock" and "onUnBlock" events.

The "onActivate" event corresponds to the creation of a task. It marks the change from the "unexisting" state to "ready". For reasons of synchronization to the creation of tasks (explained at 15.), the onActivate event increments, at the end of execution thereof, a "rendez-vous" variable, and then prompts the task to await an activation condition from the scheduler, for example by calling the "pthread_cond_wait" function from the "Pthread Condition Variable" API of the POSIX.1c standard.

The "onBlock" event is triggered when a task terminates its actual execution (AET). It then changes to the "waiting" state, in which it begins to wait until it reaches its period. When it reaches its period, the task triggers the "onUnBlock" event, which makes it change to the "ready" state, then prompts it to await a resumption condition, for example by calling the POSIX function pthread_cond_wait. This condition will be signaled by the scheduler by means of the "pthread_cond_broadcast" function, which itself belongs to the "Pthread Condition Variable" API of the POSIX.1c standard.

At any moment in its execution, a task can be preempted by another task that has become a higher priority (in the case of an EDF algorithm, because its deadline has become closer to that of the task that is being executed). The preemption of a task makes it change from the "running" state to "ready". Conversely, the task that resumes following a preemption changes from the "ready" state to the "running" state.

Figure 3:
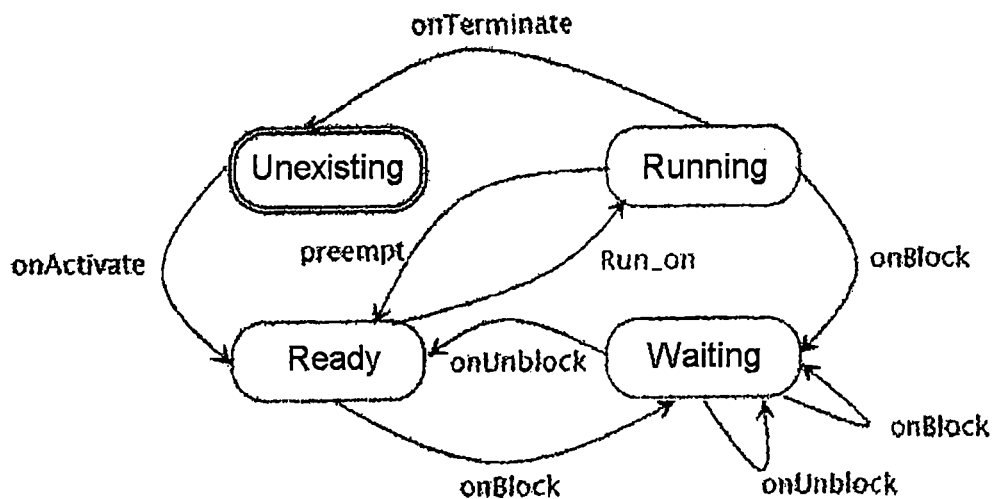
FIG. 3 shows a state transition diagram for the application tasks in a method for scheduling according to the invention.

Transitions between states triggered by task events are illustrated by FIG. 3.

To avoid interblocking phenomena, the scheduler is not called directly by task events but rather is called by means of a "pthread". In other words, the function that performs a task event (onActivate, onBlock, onUnBlock, onTerminate) calls another function "call_scheduler" (name given by way of nonlimiting example), which creates a scheduling "pthread" in order to execute the scheduler.

On each call, the scheduler performs the following actions, by means of a main function "select_" (name given by way of nonlimiting example): setup of a queue for the tasks that are ready, sorting of the queue in order of decreasing priority (highest priority task at the start of the list), preemption of nonpriority tasks that are being executed, allocation of eligible tasks to free processors and starting of eligible tasks by sending a resumption condition. Determination of eligible tasks requires the scheduler to know the state of all existing tasks. The list of input actions in this case corresponds to EDF scheduling, but can be modified—and in particular enriched—in order to implement other scheduling policies.

Owing to the multitask and multiprocessor execution, a plurality of instances of the scheduler could be called so as to be executed at the same time. In order to prevent such an eventuality, a mutex (from "MUTual Exclusion device") is used in order to protect some shared variables like the queue of tasks that are ready. The mutex is locked at the beginning of execution of the scheduler, and then released at the end of the call to the scheduler. This method guarantees that only a single instance of the scheduler is executed at a time, which allows no-risk modification of the shared variables.

The first execution of the scheduler takes place just after the tasks are created. In order to guarantee control of the tasks by the scheduler, synchronization needs to be performed in order to be sure that all the tasks have indeed finished being created before executing the scheduler and that the tasks do not start being executed until after the scheduler has given them the order. To this end, first of all, a global variable of rendez-vous type is initialized to 0 before the tasks are created. Next, all the tasks are created and put onto the first processor of the system. Right at the beginning of their creation, in other words upon execution of the onActivate( )event, each tasks increments the "rendez-vous" variable and then immediately suspends its execution by starting to await a resumption condition (use of the POSIX function "pthread_cond_wait"). When the value of the "rendez-vous" variable is equal to the number of tasks, the scheduler can be executed. During this execution, the scheduler resumes execution of the eligible tasks by signaling to them their resumption condition ("pthread_cond_broadcast" function).

In order to control the execution of application tasks, the scheduler requires the use of two specific functions for suspension or resumption of a task, called "preempt(Task)" and "resume(Task)", respectively, in FIG. 1 (reference 3), these names being given solely by way of nonlimiting example. The preempt(Task) function is based on the use of the "Signal" API of the POSIX standard. In order to preempt a task, the SIGUSR1 signal is sent to the corresponding pthread (POSIX function "pthread_kill"). The associated signal manager ("sigusr1") prompts the task to await a resumption condition ("pthread_cond_wait") upon reception of the signal. There is a resumption condition for each task of the application. The resume(Task) function signals the appropriate resumption condition to the task in question in order to resume its execution. Said function is therefore strictly equivalent to calling the Linux function pthread_cond_broadcast; in fact, the creation of a specific function is justified essentially for reasons of legibility of the code. This mechanism makes use of the fact that, in practice, the signal manager SIGUSR1 is executed by the Linux "pthread" that receives the signal. Thus, the signal manager can identify the "pthread" to be suspended (necessary for sending the wait condition to the "pthread" concerned by the pthread_cond_wait function), for example by comparing its own process identifier (tid) with that of all the "pthreads" of the application. It should be noted that the scheduler does not use the task preemption and resumption mechanisms provided by the kernel, since these are not accessible in user space.

In order to control the execution of application tasks in a multiprocessor platform, the scheduler requires an explicit function allowing the execution of a task to be fixed on a given processor. Although there is an API for control of the Linux "pthread" by the processors of a multiprocessor platform ("CPU affinity"), there is not a specific function for allocating a task to a processor. The performance of this function (indicated by "run on" in FIG. 1, reference 3, this name being given by way of nonlimiting example) assigns the processor "CPU" to the execution of the task "Task" by relying on the Linux API "CPU affinity". This is based on the specification of the processor CPU (solely) in the affinity mask of the task Task, this affinity mask then being assigned to the task (by the pthread_setaffinity_np function of the "CPU affinity" API). Next, in order to guarantee that the scheduler never executes more than one task per processor, all other application tasks are prevented from using the processor CPU. It is moreover verified that a task is never assigned to more than a single processor.

A specific function "change freq" (name given solely by way of nonlimiting example) is used in the case of a scheduler using DVFS techniques in order to control the dynamic voltage and frequency scaling of the processors (FIG. 1, reference 3). This function uses a Linux API called "CPUFreq", which allows the frequency of each processor to be changed by means of the virtual file system "sysfs". By way of example, it suffices to write the desired frequency to a file—the file "/sys/devices/system/cpu/cpu0/cpufreq/scaling_setspeed" under Linux—in order to modify the frequency of the processor 0. The scheduler can use the change_freq function in order to allow modification of the frequency by writing it to the file system. It is moreover necessary to use the "Userspace" governor first, which is the only DVFS mode under Linux that allows a user or an application to change the processor frequency at will. "Userspace" is one of the five Unix DVFS governors and its name indicates that the frequency (and therefore the voltage) can be modified at will by the user.

A possible low-consumption scheduling technique involves making use of the dynamic "slack" (time provided by a task following execution thereof) in order to adjust the operating frequency and voltage of the processor(s) (DVFS) so as to save power while providing time guarantees. By way of example, the scheduler of the invention has been used for performing scheduling of "DSF" ("Deterministic Stretch-to-Fit") type, in which the frequency of the processors (and therefore the voltage, which is dependent thereon) is recalculated for each scheduling event, using the actual execution time (AET) for accomplished tasks and the worst execution time (WCET) for the others, in order to allocate the turnaround time of the previous task to the next task, which allows the operating frequency of the processor in question to be reduced.

The annex contains source code, written in C language, for a computer program allowing the implementation of a method for scheduling according to the invention, using the DSF-DVFS technique described above. This code is given solely by way of nonlimiting example.

The code is made up of a plurality of files held in two directories: DSF_Scheduler and pm_drivers.

The DSF_Scheduler directory contains the kernel of the code of the DSF scheduler. It notably comprises the prototype file N_scheduler.h, which contains the definition of the necessary types (task structure, processor structure, etc.), the global variables (list of tasks, list of processors, parameters of the scheduler, etc.) and the prototypes of the exported functions.

The DSF_Scheduler.c file then describes the main functions of the scheduler. The most important is the select_ function, this describing the whole scheduling process performed at each scheduling instant. The task events onActivate, onBlock, onUnBlock and on Terminate that trigger the scheduling instants are likewise described in this file. The scheduling function relies on a slow_down function that computes and applies the change of frequency. Finally, the distinctive features of the scheduler when the application starts have required the development of a specific function start_sched. This function is executed just a single time right at the beginning of the application being launched and is based largely on the code of the main scheduler (select_). For all other scheduling instants, it is the select_function that is called, via the call_scheduler function. The Makefile file is used for compilation.

The application to be scheduled is described in the file N_application.c. This is also the file containing the "hand" of the program. This performs the various initializations that are required, creates the POSIX tasks, launches the scheduler and synchronizes everything. It should be stated here that an application is seen as a set of tasks, each having temporal characteristics such as the worst case execution time (WCET), the period, the deadlines, etc. The tasks used perform simple processing (multiplication of the elements in a table of integers) up to a certain execution time (AET)—which is described by the function usertask_actualexec—and then put themselves into a mode for awaiting their reactivation (usertask_sleepexec) when they reach their period.

Finally, in order to keep a structure for the code that is as clear as possible by keeping only the essential functions of the scheduler in the N_Scheduler.c file, the secondary functions that are required have themselves been grouped into another in a file: N_utils.c. By way of example, this contains functions for initialization, task preemption, allocation of tasks to processors, sorting, display, etc.

The pm_drivers directory contains the functions from the lowest level on which the scheduler relies. These are more precisely the prototype files intel_kernel_i5_m520.h, pm_typedef.h and the file pm_cpufreq.c.

The intel_kernel_i5_m520.h prototype file contains the description of the target platform whose name it bears. This is information about the number of processors on the platform and about the possible frequencies for each of the kernels, which are represented in the form of states. The types used (e.g. the processor states) are defined in the pm_typedef.h file.

The pm_cpufreq.c file contains particularly the functions that allow the dynamic effective change of frequency on the execution platform, taking the Linux API CPUfreq as a basis. The dynamic voltage and frequency scaling is managed by policies called governors under Linux, which are known per se. More precisely, in order to be able to change the processor frequency/frequencies, it is first of all necessary to use a governor called userspace. A first set_governor function is present for this. Next, the interaction with the Linux frequency scaling pilot is effected by means of exchange files located in /sys/devices/system/cpu/cpuX/cpufreq/, where X represents the number of the processor in question. The open_cpufreq and close_cpufreq functions allow the scaling_setspeed exchange file to be opened and closed. The frequency scaling is carried out by the function CPU_state_manager_apply_state.

The various functions notably use the following POSIX APIs:
Pthreads API:
  pthread_create, for the creation of a Pthread,
  pthread_join, for synchronizing termination of the Pthreads,
  pthread_exit, at the end of execution of a Pthread,
  pthread_cancel, for forcing termination of a Pthread.
Signal API:
  pthread_kill
Condition variables API
  pthread_cond_wait
  pthread_cond_broadcast
Mutex API
  pthread_mutex_lock
  pthread_mutex_unlock The various functions likewise use the following non-POSIX APIs:
CPU affinity" API:
  CPU_ZERO for clearing the list of processors allocated to a task,
  CPU_SET for adding a processor to the list of allocated processors,
  CPU_CLR for removing a processor from the list of allocated processors,
  CPU_ISSET for testing whether a task is assigned to a given processor, and
  pthread_setaffinity_np for fixing the affinity mask to a task.
CPUfreq API for dynamic voltage and frequency scaling.

The invention has been described in detail with reference to a particular embodiment: multiprocessor system under Linux, EDF scheduling policy with dynamic voltage and frequency scaling (DVFS). These are not essential limitations, however.

Thus, the method for scheduling of the invention can be applied to a monoprocessor platform and/or is able not to implement consumption reduction mechanisms.

Implementation of the invention is particularly easy under LINUX, because the APIs described above are available. However, a scheduler according to the invention can be provided under another operating system that is compatible with the POSIX standard and more precisely with the IEEE POSIX 1.c (or, equivalently, POSIX 1003.1c) standard, provided that it supports an equivalent of the CPU affinity (for multiprocessor applications) and CPUfreq (for applications making use of the dynamic voltage and frequency scheduling) APIs.

Other scheduling policies with deadline constraints can be implemented, such as "Rate Monotonic" (RM), "Deadline Monotonic" (DM) or "Latest Laxity First" (LLF) policies, for example.

Equally, various techniques for reducing consumption can be implemented. By way of nonlimiting example, it is possible to cite the DSF ("Deterministic Stretch-to-Fit") technique, making use of dynamic voltage and frequency scaling (this is the technique used in the example that has just been described), and AsDPM ("Assertive Dynamic Power Mangement"), making use of processor rest modes.

It should be noted that the reproduction of a task scheduler under deadline constraints in user space as described above can be implemented only under certain conditions that are dependent on the operating system (OS). By way of example, these conditions are as follows. The method according to the invention must support the notion of preemptive scheduling in user space. The possibility of explicit preemption of a task from user space is a feature that cannot be implemented in all Os. The task model needs to integrate deadline and state constraint attributes. The possibility of extension of the task model with these attributes, which are accessible in user mode, is dependent on the OS.

It should likewise be noted that the implementation of low-consumption oriented scheduling policies in user space can be effected only under certain conditions that are dependent on the OS. The possibility of temporarily putting aside or dynamically scaling the frequency of a processor in user space cannot be implemented in all operating systems, notably under Windows.

It should likewise be noted that the method according to the invention does not require any explicit intervention of the supervisor mode and is based exclusively on mechanisms in user mode in the form of APIs.

The standard Linux POSIX task structure (pthread), which is described in the particular embodiment of FIG. 1, can be generalized as a standard POSIX task structure (thread) under an OS that allows it to be implemented. Like the standard Linux POSIX task structure (pthread) of FIG. 1, the implementation of the invention for this generalized task structure requires them to be extended by parameters that are accessible in user space. Equally, like the application model described for FIG. 1, the information concerning the characteristics and time constraints of the tasks is added to a specific structure that extends the standard POSIX task type by parameters that are made accessible in user space.

It should be noted that the method for preemption of POSIX tasks in user space that is implemented in the invention does not exist in what are known as "consumer" OSs, that is to say those devoid of realtime constraints. According to the invention and generally, in order to control the execution of application tasks, the scheduler needs to perform a functionality of explicit preemption of POSIX tasks in user space, which is based on the use of two specific functions for the suspension and resumption of a task.

The invention claimed is:

1. A method for scheduling tasks with deadline constraints, which is based on a model of independent periodic tasks and entirely performed in user space, in which:
   each task to be scheduled is associated with a data structure, which is defined in user space and contains at least one time information item and an information item that is indicative of a state of activity of the task, said state of activity being chosen from a list comprising at least:
   a state of a task being executed;
   a state of a task awaiting the end of its execution period; and
   a state of a task ready to be executed, awaiting a resumption condition;
   in the course of its execution, each task modifies said information item that is indicative of its state of activity and, if need be, according to a predefined scheduling policy, calls a scheduler that is executed entirely in user space;
   upon each call, said scheduler:
   sets up a queue for the tasks that are ready to be executed, awaiting a resumption condition;
   sorts said queue according to a predefined priority criterion;
   if necessary, preempts a task being executed by sending it a signal forcing it to change to said state of a task ready to be executed, awaiting a resumption condition; and
   sends said resumption condition at least to the task that is at the head of said queue;
   said data structure containing information indicative of a thread associated with said task comprising:
   a condition associated with said task;
   subsequent deadline of said task;
   worst case execution time of said task;
   best case execution time of said task; and
   actual execution time of said task;
   said scheduler using a specific function for the allocation of said task on a processor, said method for scheduling tasks being executed under an operating system that is compatible with a POSIX standard, said operating system being a Linux system.

2. The method for scheduling as claimed in claim 1, in which said scheduling policy is a preemptive policy, such as EDF, RM, DM or LLF.

3. The method for scheduling as claimed in claim 1 implemented in a multiprocessor platform, in which said data structure likewise comprises an information item relating to a processor to which the corresponding task is assigned, and in which said scheduler assigns to a processor of the system each task that is ready to be executed.

4. The method for scheduling as claimed in claim 3, wherein upon each call for the scheduler, a "pthread" is created in order to ensure execution thereof, and in which the assignment of a task to a processor is performed by means of the CPU Affinity API.

5. The method for scheduling as claimed in claim 3, wherein MUTEX is used in order to ensure the execution of a single instance of the scheduler at a time, and in which the assignment of a task to a processor is performed by mans of the CPU Affinity API.

6. The method for scheduling as claimed in claim 1, in which said scheduler modifies the clock frequency and the power supply voltage of the or of at least one processor according to a DVFS policy.

7. The method for scheduling as claimed in claim 1, having an initialization step, in the course of which:
   the tasks to be scheduled are created, assigned to one and the same processor and put into a state awaiting a resumption condition, a global variable called a rendez-vous variable being incremented or decremented when each said task is created;
   when said rendez-vous variable takes a predefined value indicating that all the tasks have been created, said scheduler is executed for the first time.

8. The method for scheduling as claimed in claim 1, in which said data structure likewise contains information that is indicative of a thread associated with said task and with its worst-case execution time.

9. The method for scheduling as claimed in claim 1, in which, upon each call for the scheduler, a "pthread" is created in order to ensure execution thereof.

10. The method for scheduling as claimed in claim 1, involving the use of a MUTEX in order to ensure the execution of a single instance of the scheduler at a time.

11. The method for scheduling as claimed in claim 1, in which said scheduling policy is a preemptive policy selected from the group consisting of EDF, RM, DM and LLF.

12. The method for scheduling as claimed in claim 1, wherein upon each call for the scheduler, a "pthreacg" is created in order to ensure execution thereof.

13. The method for scheduling as claimed in claim 1, wherein upon each call for the scheduler, a "pthread" is created in order to ensure execution thereof, and in which the assignment of a task to a processor is performed by means of the CPU Affinity API.

14. The method for scheduling as claimed in claim 1, wherein MUTEX is used in order to ensure the execution of a single instance of the scheduler at a time, and in which the assignment of a task to a processor is performed by means of the CPU Affinity API.

15. The method for scheduling as claimed in claim 1, involving the use of a MUTEX in order to ensure the execution of a single instance of the scheduler at a time.

16. The method for scheduling as claimed in claim 1, in which said operating system is a Linux system, and in which, upon each call for the scheduler, a "pthread" is created in order to ensure execution thereof.

17. A computer program product comprising a non-transitory computer readable memory programmed with computer software, that, when executed by an apparatus, causes the apparatus to perform the method of claim 1.

* * * * *

UNITED STATES PATENT AND TRADEMARK OFFICE
CERTIFICATE OF CORRECTION

PATENT NO. : 9,582,325 B2
APPLICATION NO. : 14/441070
DATED : February 28, 2017
INVENTOR(S) : Bilavarn et al.

Page 1 of 1

It is certified that error appears in the above-identified patent and that said Letters Patent is hereby corrected as shown below:

In the Claims

Column 12,
Line 4, "mans" should read --means--;
Line 34, ""pthreacg"" should read --"pthread"--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*